United States Patent
Sharrun et al.

(10) Patent No.: US 8,747,714 B2
(45) Date of Patent: Jun. 10, 2014

(54) METHOD OF MANUFACTURING MESH-REINFORCED THERMOPLASTIC MEMBRANES

(75) Inventors: Greg Sharrun, Greenville, SC (US); Brian Saxinger, Dallas, NC (US)

(73) Assignee: Firestone Building Products Company, LLC, Indianapolis, IN (US)

( * ) Notice: Subject to any disclaimer, the term of this patent is extended or adjusted under 35 U.S.C. 154(b) by 519 days.

(21) Appl. No.: 12/496,805

(22) Filed: Jul. 2, 2009

(65) Prior Publication Data

US 2010/0001428 A1    Jan. 7, 2010

Related U.S. Application Data

(60) Provisional application No. 61/133,868, filed on Jul. 3, 2008.

(51) Int. Cl.
*B32B 1/00* (2006.01)

(52) U.S. Cl.
USPC .................................... 264/171.13

(58) Field of Classification Search
USPC .................................... 264/171.13
See application file for complete search history.

(56) References Cited

U.S. PATENT DOCUMENTS

| | | | |
|---|---|---|---|
| 3,230,127 A | | 1/1966 | Cleereman et al. |
| 3,406,052 A | | 10/1968 | Peters |
| 3,477,126 A | | 11/1969 | Price |
| 3,656,513 A | * | 4/1972 | Evans et al. ............ 138/141 |
| 4,256,791 A | | 3/1981 | Holmstrom et al. |
| 4,788,088 A | | 11/1988 | Kohl |
| 5,155,979 A | | 10/1992 | McDonald |
| 5,236,543 A | | 8/1993 | Riedel |
| 5,369,941 A | | 12/1994 | Rapparini |
| 5,564,252 A | | 10/1996 | Adelmann |
| 6,054,178 A | | 4/2000 | Howells |
| 6,214,147 B1 | | 4/2001 | Mortellite et al. |
| 2004/0020585 A1 | * | 2/2004 | Hubbard et al. ............ 156/157 |
| 2007/0141303 A1 | | 6/2007 | Steindorf |
| 2010/0001428 A1 | * | 1/2010 | Sharrun et al. ............ 264/171.13 |

FOREIGN PATENT DOCUMENTS

| | | |
|---|---|---|
| CH | 486336 A | 2/1970 |
| DE | 2946739 A1 | 5/1980 |
| GB | 1200998 A | 8/1970 |
| WO | WO 9715442 A1 | 5/1997 |

OTHER PUBLICATIONS

Extended European Search Report, EP Appl. No. 09 00 8760, dated Aug. 19, 2010, 6 pages.

* cited by examiner

*Primary Examiner* — Larry Thrower
(74) *Attorney, Agent, or Firm* — Jason A. Houser; Arthur M. Reginelli

(57) ABSTRACT

A method of simultaneously manufacturing multiple mesh-reinforced thermoplastic membranes including providing a roll of mesh reinforcing sheet having a first side and a second side and drawing the mesh sheet through a cutting device to the cut the mesh sheet longitudinally and create a plurality of mesh sheets. The method also includes separating the plurality of mesh sheets to create gaps therebetween and simultaneously extruding a molten thermoplastic layer onto both the first and second sides of the plurality of mesh sheets and over the gaps to create a single mesh-reinforced thermoplastic membrane. The mesh-reinforced thermoplastic membrane is then cut longitudinally along the gaps between the plurality of mesh sheets to create a plurality of mesh-reinforced membranes, each membrane having a pair of longitudinally extending gum edges.

9 Claims, 3 Drawing Sheets

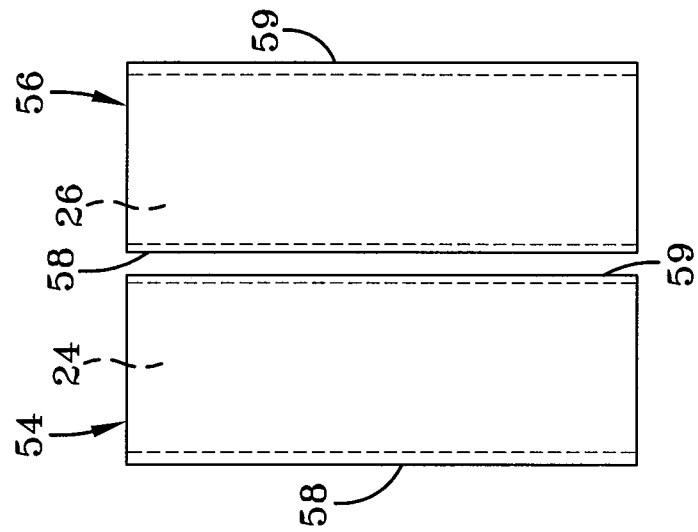
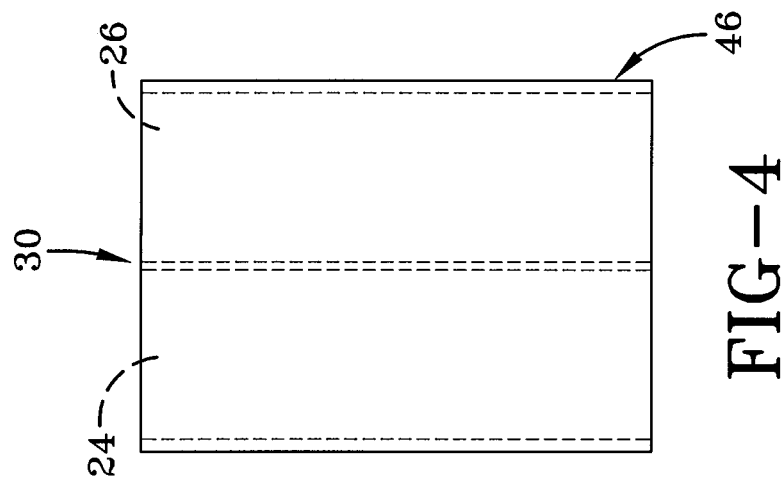
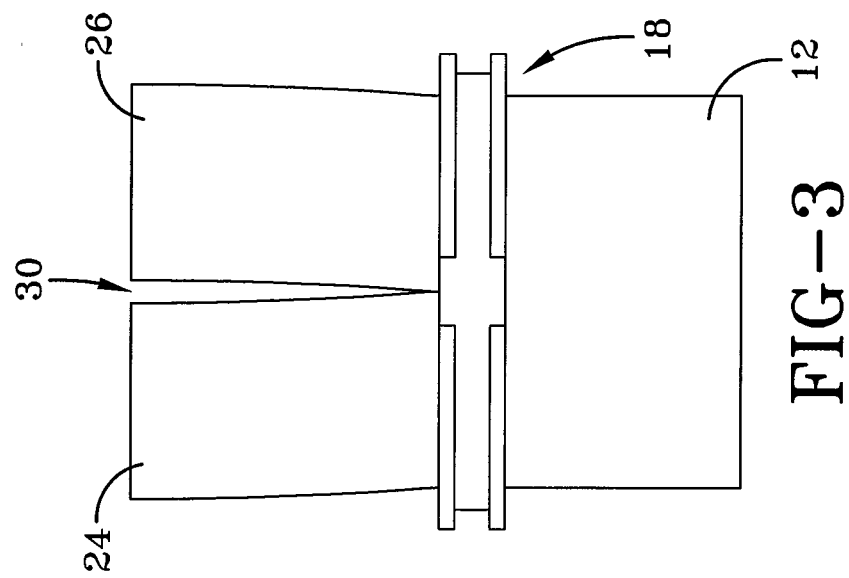

METHOD OF MANUFACTURING MESH-REINFORCED THERMOPLASTIC MEMBRANES

This application claims the benefit of U.S. Provisional Application Ser. No. 61/133,868, filed on Jul. 3, 2008, and is incorporated herein by reference.

FIELD OF THE INVENTION

One or more embodiments of this invention relate to a method of manufacturing mesh-reinforced thermoplastic membranes. More particularly, one or more embodiments of this invention relate to a method of simultaneously manufacturing multiple mesh-reinforced membranes with a pair of opposing, longitudinal gum edges.

BACKGROUND OF THE INVENTION

Fabric mesh reinforced thermoplastic membranes have been available for some time for a number of uses, including, for example, for use as a roofing membrane, and pond, reservoir, pit and canal liners. These membranes typically have a fabric reinforcing mesh sheet encapsulated therein so that it is not visible in the final product. There are various conventional methods for making these mesh-reinforced membranes. One conventional method involves extruding molten thermoplastics onto one side of a fabric mesh sheet to secure the fabric mesh to one half of the thermoplastic membrane. The resulting composite is then heated and a second layer of molten thermoplastic is extruded onto the opposite side of the fabric mesh sheet, resulting in a thermoplastic membrane with an integrated fabric mesh reinforcing sheet.

Another conventional method of making fabric mesh reinforced thermoplastic membranes involves drawing a fabric mesh sheet through an extrusion device where molten thermoplastic is extruded onto both sides of the sheet simultaneously, and the molten membrane is then drawn through a series of calendar rolls to help form the membrane. The membrane may then be drawn over a cooling bed and exposed to ambient air to return the thermoplastic to an ambient temperature.

In some cases, when relatively narrow reinforced thermoplastic membranes are required, a single reinforced membrane will be created and then cut in half to produce two reinforced membranes of the desired width. By cutting a wider reinforced membrane in half to make two narrower membranes, the output of the manufacturing process is doubled relative to a production method where a single narrow reinforced membrane is produced. However, this method results in a rough edge where the reinforced membrane is cut to create two narrow membranes. Thus, unlike the uncut reinforced membranes, the narrow reinforced membranes formed from cutting a single membrane do not have fully encapsulated edges, also known as gum edges.

There is therefore a need for a method of manufacturing narrow mesh-reinforced thermoplastic membranes that have fully encapsulated edges extending longitudinally along both sides of the membrane, without sacrificing the efficiency available from existing methods of manufacture.

SUMMARY OF THE INVENTION

Certain embodiments of this invention provide a method of simultaneously manufacturing multiple mesh-reinforced thermoplastic membranes comprising: providing a roll of mesh reinforcing sheet having a first side and a second side; drawing said mesh sheet through a cutting device to cut said mesh sheet longitudinally and create a plurality of mesh sheets; separating said plurality of mesh sheets to create gaps therebetween; simultaneously extruding a molten thermoplastic layer onto both said first and second sides of said plurality of mesh sheets and over said gaps between said mesh sheets to create a single mesh-reinforced thermoplastic membrane; and cutting said mesh-reinforced thermoplastic membrane longitudinally along said gaps between said plurality of mesh sheets to create a plurality of mesh-reinforced membranes, each membrane having a pair of longitudinally extending gum edges.

Certain embodiments of this invention also provide a method of simultaneously manufacturing a pair of mesh-reinforced thermoplastic membranes employing a calender comprising: providing mesh reinforcing sheets having a first side and a second side; guiding two of the mesh reinforcing sheets into the calender while laterally spaced by a gap; simultaneously extruding a molten thermoplastic layer onto both said first and second sides of said mesh reinforcing sheets over said gap therebetween and laterally beyond the longitudinal edges of said mesh reinforcing sheets opposite said gap to create a single fully encapsulated mesh-reinforced thermoplastic membrane; and cutting said mesh-reinforced thermoplastic membrane along said gap between said mesh sheets to create two mesh reinforced membranes, each membrane having a pair of longitudinally extending gum edges.

Certain embodiments of this invention also provide a method of simultaneously manufacturing a pair of mesh-reinforced thermoplastic membranes employing a calender comprising: providing mesh reinforcing sheets having a first side and a second side; guiding two of the mesh reinforcing sheets into the calender; simultaneously extruding a molten thermoplastic layer onto both said first and second sides of said mesh reinforcing sheets; and cutting said mesh-reinforced thermoplastic membrane along said gap between said mesh sheets to create two mesh reinforced membranes.

BRIEF DESCRIPTION OF THE DRAWINGS

FIG. 3 is top view of a mesh reinforcing sheet being cut and separated according to the concepts of at least one embodiment of the present invention.

FIG. 4 is top view of a thermoplastic membrane having two mesh sheets therein.

FIG. 5 is top view of two mesh-reinforced thermoplastic membranes produced according to the concepts of at least one embodiment of the present invention.

DETAILED DESCRIPTION OF ILLUSTRATIVE EMBODIMENTS

The present invention relates to a method of manufacturing fabric mesh reinforced thermoplastic membranes. An exemplary manufacturing line for carrying out the method of the present invention is depicted by the schematic in FIG. 1, and is generally indicated by the numeral 10. More particularly, at least one embodiment of the present invention relates to a method of manufacturing two or more fabric mesh reinforced thermoplastic membranes simultaneously, the resulting membranes having fully encapsulated edges on both sides of the membrane.

Figure 1:
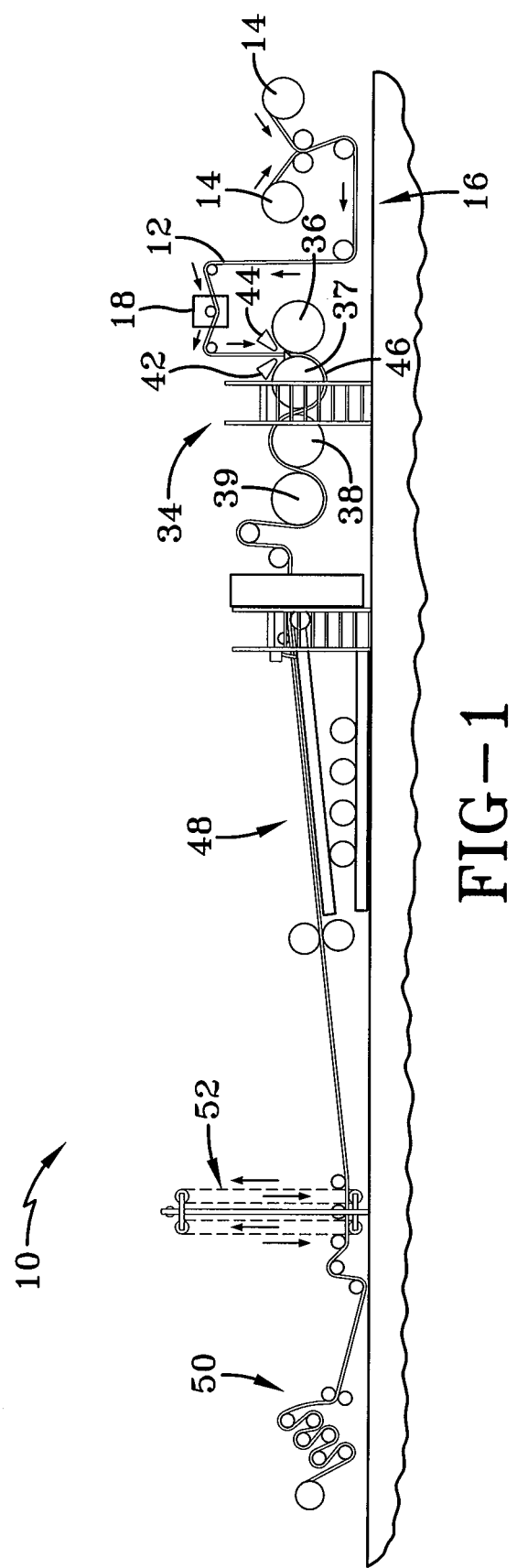
FIG. 1 is schematic view of a manufacturing line for making the mesh-reinforced thermoplastic membranes according to at least one embodiment of the present invention.

Line 10, as shown in FIG. 1, is a horizontal manufacturing line, although a vertical arrangement may also be used without deviating from the scope of the present invention. While the invention, as discussed herein, is focused on a method of producing two narrow, fabric mesh-reinforced membranes from a single wide-width roll of the reinforcing mesh sheet, is contemplated that more than two membranes may be produced by the same method simply by feeding additional mesh reinforcing sheets into an extruder, or by providing additional cutting and spreading devices along the width of the mesh reinforcing sheet, as will be appreciated by those skilled in the art.

In one or more embodiments, a mesh reinforcing fabric sheet 12 is provided in the form of rolls 14, which may come in a variety of widths and lengths. In one or more embodiments of the invention, a mesh reinforcing sheet 12 may be provided having a width of between approximately 2 and 20 feet, in other embodiments a width of between approximately 4 and 16 feet, and in other embodiments a width of between approximately 6 and 12 feet. In one or more embodiments, more than one roll 14 of mesh sheet 12 is provided to manufacturing line 10 so that transitions between an empty roll and a new roll may be handled more efficiently and with less interruptions to line 10. In this way, line 10 continues to run as one roll 14 is replaced with a new roll.

The fabric mesh can be made of plastic material such as polyester or nylon, natural fibers such as cotton or hemp, metal, or other materials known in the art. A fabric mesh must be employed that has an open mesh and that can withstand the temperature of the molten thermoplastic during the extrusion process, as will be discussed in greater detail below. The fabric mesh sheet can be a woven mesh or a non-woven mesh.

In one or more embodiments the fabric mesh is thinner than the resulting membrane so that a protective coating of thermoplastic is provided on both sides of mesh sheet 12. In one or more embodiments, mesh sheet 12 may have a thickness of at least 1 mil., in other embodiments at least 2 mils., in other embodiments at least 4 mils., in other embodiments at least 6 mils., and in other embodiments at least 10 mils. In these or other embodiments, mesh sheet 12 may have a thickness of less than 40 mils., in other embodiments less than 30 mils., in other embodiments less than 20 mils., and in other embodiments less than 15 mils.

In one or more embodiments, mesh sheet 12 is pulled and guided from rolls 14 by a series of rollers 16, as is known in the art. Rollers 16 apply tension to mesh sheet 12 to cause roll 14 to un-roll, and to draw mesh sheet 12 towards a cutting and spreading station 18, as discussed below, without allowing mesh sheet 12 to wrinkle or fold. Rollers 16 may be of any known configuration adapted to draw mesh sheet 12 from rolls 14 and toward cutting and spreading station 18.

Figure 2:
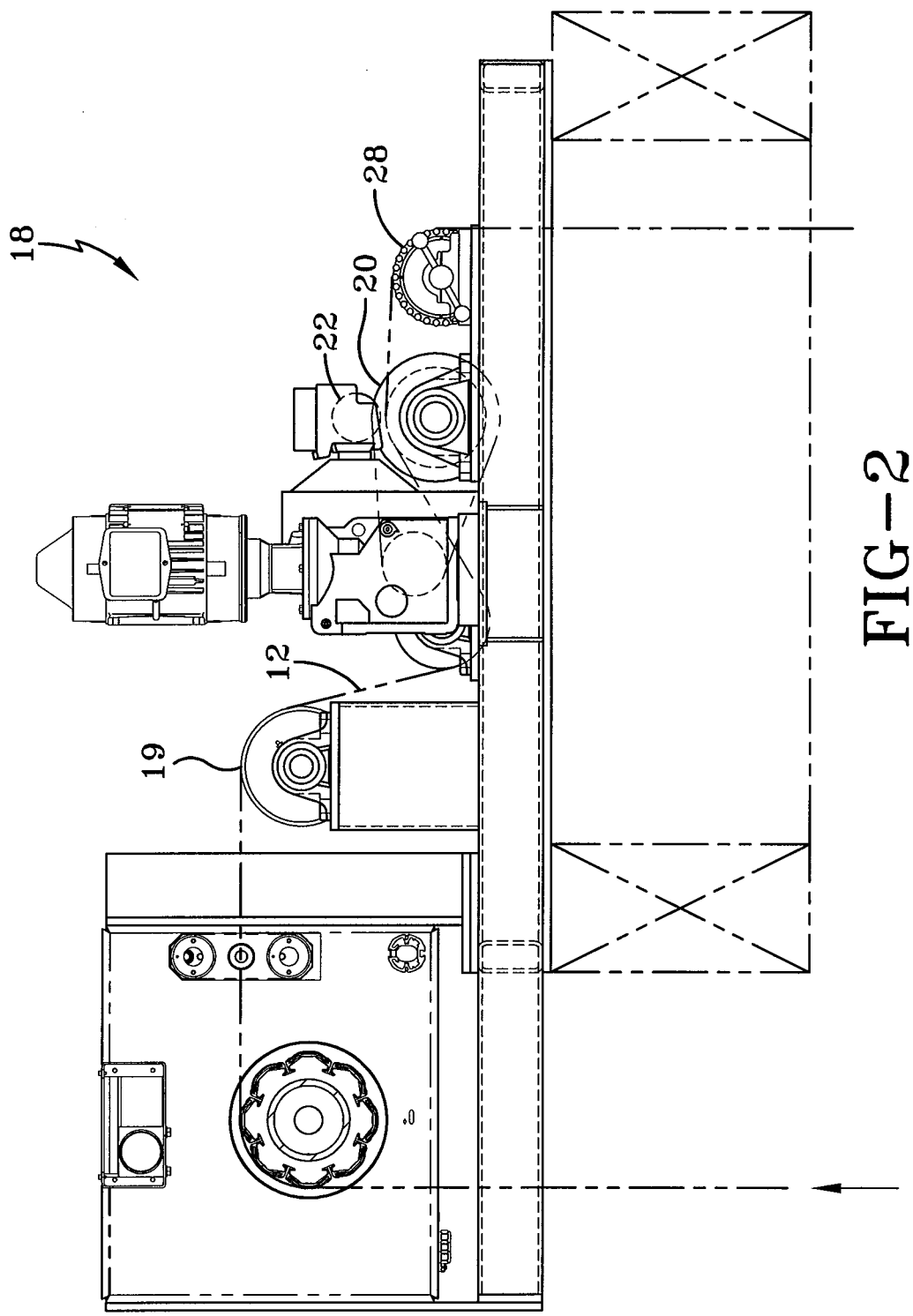
FIG. 2 is a side view of a cutting and spreading device according to the concepts of at least one embodiment of the present invention.

Cutting and spreading station 18 is shown in FIG. 2 and includes a plurality of rollers 19 that guide mesh sheet 12 through the device. In one or more embodiments, at least one roller 20 is driven to propel mesh sheet 12 through cutting and spreading station 18. A crush-cut knife 22 may be provided adjacent to driven wheel 20 to cut mesh sheet 12 into a first mesh sheet 24 and a second mesh sheet 26 (FIG. 3). Crush-cut knife 22 may ride on driven roller 20, and, therefore, rotate along with driven roller 20 as mesh sheet 12 passes between the two. In one or more embodiments, driven roller 20 may be provided with a channel to receive an edge of crush-cut knife 20, enabling knife 20 to creating a shearing force to cut mesh sheet 12. In one or more embodiments, mesh sheet 12 may be cut longitudinally at approximately its center point to create substantially equally sized first mesh sheet 24 and second mesh sheet 26.

While the method described herein and depicted in the accompanying drawings includes the steps of cutting and spreading to create a plurality of mesh sheets from a single mesh sheet, it is also contemplated that a plurality of mesh sheets may be provided, thereby making the steps of cutting and spreading unnecessary. In such a case, each of the mesh sheets provided may conform to the description provided herein with respect to the properties of mesh sheet 12. In one or more embodiments, the plurality of mesh sheets may, together, have the dimensions of mesh sheet 12 prior to the step of cutting. In one or more embodiments, the plurality of mesh sheets may be provided in rolls.

After mesh sheet 12 is cut to produce first mesh sheet 24 and second mesh sheet 26, the two sheets may proceed to an expander roller 28, which acts to separate the two sheets 24 and 26 to produce a gap 30 (FIG. 3) between the sheets along the sheared edges. In one or more embodiments, expander roller 28 may be a center guided polyband expander roller that acts to create gap 30 while also maintaining gap 30 at a center point in the lateral direction so that a symmetrical thermoplastic membrane is created, as will be discussed below. Such polyband expander rollers are well known and widely used in the art.

With reference to FIG. 3, the cutting and spreading station 18 is shown, as well as the mesh sheet 12 as it is cut and spread. As can be seen, a single mesh sheet 12 enters cutting and spreading station 18, and first mesh sheet 24 and second mesh sheet 26 exit station 18 having a gap 30 therebetween. In one or more embodiments, gap 30 may be between approximately 0.25 and 1.5 inches in width, in other embodiments between approximately 0.5 and 1.25 inches in width, and in other embodiments approximately 1.0 inches in width.

After mesh sheet 12 has been cut to create first mesh sheet 24 and second mesh sheet 26, and spread to create gap 30, the pair of mesh sheets are drawn into a thermoplastic membrane extrusion apparatus 34 (FIG. 1) while maintaining gap 30 between the two mesh sheets. In one or more embodiments, extrusion apparatus 34 includes a plurality of calender rolls 36, 37, 38, and 39, and a pair of extruders 42 and 44. Extruders 42 and 44 are positioned at the throat of two of the calendar rollers 36 and 37 with a gap therebetween so that a molten thermoplastic may be extruded onto both sides of mesh sheet 12. Extruders 42 and 44 heat the thermoplastic and force the molten thermoplastic through a die to form a desired product. Any conventional extruder device known in the art may be employed.

Rollers 36 and 37 press the molten thermoplastic through and around first mesh sheet 24 and second mesh sheet 26, and into gap 30, to form a thermoplastic membrane 46 with a uniform thickness. In one or more embodiments, extruders 42 and 44 extrude the same molten thermoplastic material at a substantially equal thickness to both sides of mesh sheet 12. After passing between extruders 42 and 44, first mesh sheet 24 and second mesh sheet 26 are fully encapsulated in thermoplastic membrane 46, as shown in FIG. 4, including along the longitudinal edges of the membrane.

Virtually any type of thermoplastic can be utilized in the present invention. In one or more embodiments the thermoplastic has a melt index of at least 1.0 when tested at 2.14 Kg. at 190° C. In one or more embodiments Polypropylene based thermoplastic olefin may be used, which has been found to be suitable due to its thermoplastic properties, strength, and resistance to oxidation and UV. In other embodiments various other thermoplastics may be used, including, for example, polyethylene, polystyrene, polyester thermoplastic, urethane, and polyvinyl plastics.

Calender rolls 36, 37, 38, and 39 may be powered rolls that draw thermoplastic membrane 46 away from extruders 42 and 44, while also forming and cooling the membrane while it is still in a non-cured state. Thermoplastic membrane 46 weaves between and around the rolls as it moves away from extruders 42 and 44. In one or more embodiments, rolls 36, 37, 38, and 39 are powered to rotate at substantially the same speed. In the same or other embodiments, one or more of the rolls may be provided with a textured surface to create a textured surface on one or both sides of thermoplastic membrane 46.

Calender rolls 36, 37, 38, and 39 may be maintained at various temperatures to assist with the extrusion and forming of thermoplastic membrane 46. These temperature controlled calender roll systems are well known in the art of thermoplastic membranes. In one embodiment, roll 37 may be maintained at a higher temperature than roll 36 so that thermoplastic membrane 46 sticks thereto as it exits extruders 42 and 44, as is known by persons skilled in the art.

In one or more embodiments, calender rolls 38 and 39 may be maintained at a temperature lower than that of roll 37 to begin cooling thermoplastic membrane 46. In one embodiment calender roll 36 may be maintained at approximately 90° F., calender roll 37 at approximately 160° F., calender roll 38 at approximately 90° F., and calender roll 39 at approximately 90° F. After exiting calender rolls 36-39, thermoplastic membrane 46 may then proceed to a cooling area 48 to be cooled even further. Thermoplastic membrane 46 may be cooled by any conventional method known to persons skilled in the art, such as, for example, by exposing the thermoplastic membrane to ambient air.

In one or more embodiments, thermoplastic membrane 46, after being cooled, proceeds to a final cutting and rolling station 50. An accumulator 52 may be provided in-line between cooling area 48 and cutting and rolling station 50 to accommodate for slow-downs or stoppages at various stations of manufacturing line 10. Accumulator 52 can take-up slack or let-out slack in the product to reduce the instances in which line 10 must be stopped.

In one or more embodiments, thermoplastic membrane 46 is cut at cutting and rolling station 50 along the center of gap 30 between first mesh sheet 24 and second mesh sheet 26 within the membrane. This cutting of thermoplastic membrane 46 may be accomplished by any mechanism known in the art. The cutting of thermoplastic membrane 46 produces a first thermoplastic membrane 54 and a second thermoplastic membrane 56, each having first mesh sheet 24 or second mesh sheet 26, respectively, fully encapsulated therein, as seen in FIG. 5. As a result, each thermoplastic membrane 54 and 56 has a pair of longitudinally extending gum edges 58 and 59. In one or more embodiments, the two thermoplastic membranes 54 and 56 are then rolled separately for storage and shipment.

As will be appreciated, by cutting along the center of gap 30 two reinforced thermoplastic mesh sheets are produced with a width of approximately half of thermoplastic membrane 46. Each membrane produced includes a mesh sheet fully encapsulated therein and a pair of gum edges 58 and 59. As discussed above, the reinforced thermoplastic membranes having fully encapsulated mesh sheets are advantageous over reinforced membranes produced by the prior art methods because those membranes resulted in an exposed edge of the mesh sheet, which may lead to more rapid deterioration of the membrane, may cause the membrane to take on moisture, and is aesthetically unappealing. In addition, the method of the present invention does not reduce the efficiency of production methods, as two reinforced thermoplastic membranes are produced simultaneously.

Various modifications and alterations that do not depart from the scope and spirit of this invention will become apparent to those skilled in the art. This invention is not to be duly limited to the illustrative embodiments set forth herein.

What is claimed is:

1. A method of providing narrow roofing membranes having a pair of longitudinally extending gum edges for installation on a roofing surface, the method comprising the steps of:
    cutting a mesh reinforcing material having a first side and a second side to create at least two mesh reinforcing sheets;
    separating said at least two mesh reinforcing sheets to create a gap between longitudinal edges of adjacent sheets, said gap sized between approximately 0.25 and 1.5 inches in width;
    simultaneously extruding a molten thermoplastic layer onto both said first and second sides of said at least two mesh reinforcing sheets and into said gap between said mesh reinforcing sheets to create a single mesh-reinforced thermoplastic roofing membrane, wherein the molten thermoplastic is extruded onto said first and second sides of said mesh reinforcing sheets at a throat of a calendar and wherein said molten thermoplastic is extruded beyond the longitudinal edges of said mesh reinforcing sheets opposite said gap;
    cutting said mesh-reinforced thermoplastic roofing membrane along about a center of said gap between said mesh reinforcing sheets to create at least two narrow mesh-reinforced thermoplastic roofing membranes having a pair of longitudinally extending gum edges so that said gum edge is about between 0.125 and 0.75 inches in width; and
    rolling each of said narrow mesh reinforced thermoplastic roofing membranes for shipment to an installation site.

2. The method of claim 1, where the step of extruding said molten thermoplastic includes employing spaced apart calendar rolls through which said thermoplastic membrane is drawn immediately following extrusion to help encapsulate said mesh sheets and fuse said thermoplastic layers.

3. The method of claim 2, including the step of heating one of said calendar rollers to maintain said thermoplastic membrane above 100° C.

4. The method of claim 1, further comprising the step of drawing said single mesh-reinforced membrane through a series of cooling rollers to cool said membrane and solidify it prior to said step of cutting.

5. The method of claim 1, further comprising the step of exposing said single mesh-reinforced membrane to ambient air to cool said membrane to an ambient air temperature before said step of cutting.

6. The method of claim 2, including maintaining said plurality of mesh sheets under tension prior to passing between said calendar rollers to prevent irregularities in said mesh-reinforced membranes, and ensure complete encapsulation of said mesh reinforcing sheets.

7. The method of claim 1, including maintaining said gaps between said plurality of mesh sheets at approximately one inch.

8. The method of claim 1, where said mesh sheet is cut by a crush cut knife to form said plurality of mesh sheets.

9. The method of claim 1, wherein said mesh has a thickness less than 40 mils such that the width of said gum edge is between 3.125 and 18.75 times wider than the thickness of said mesh reinforcing sheet.

* * * * *